UNITED STATES PATENT OFFICE.

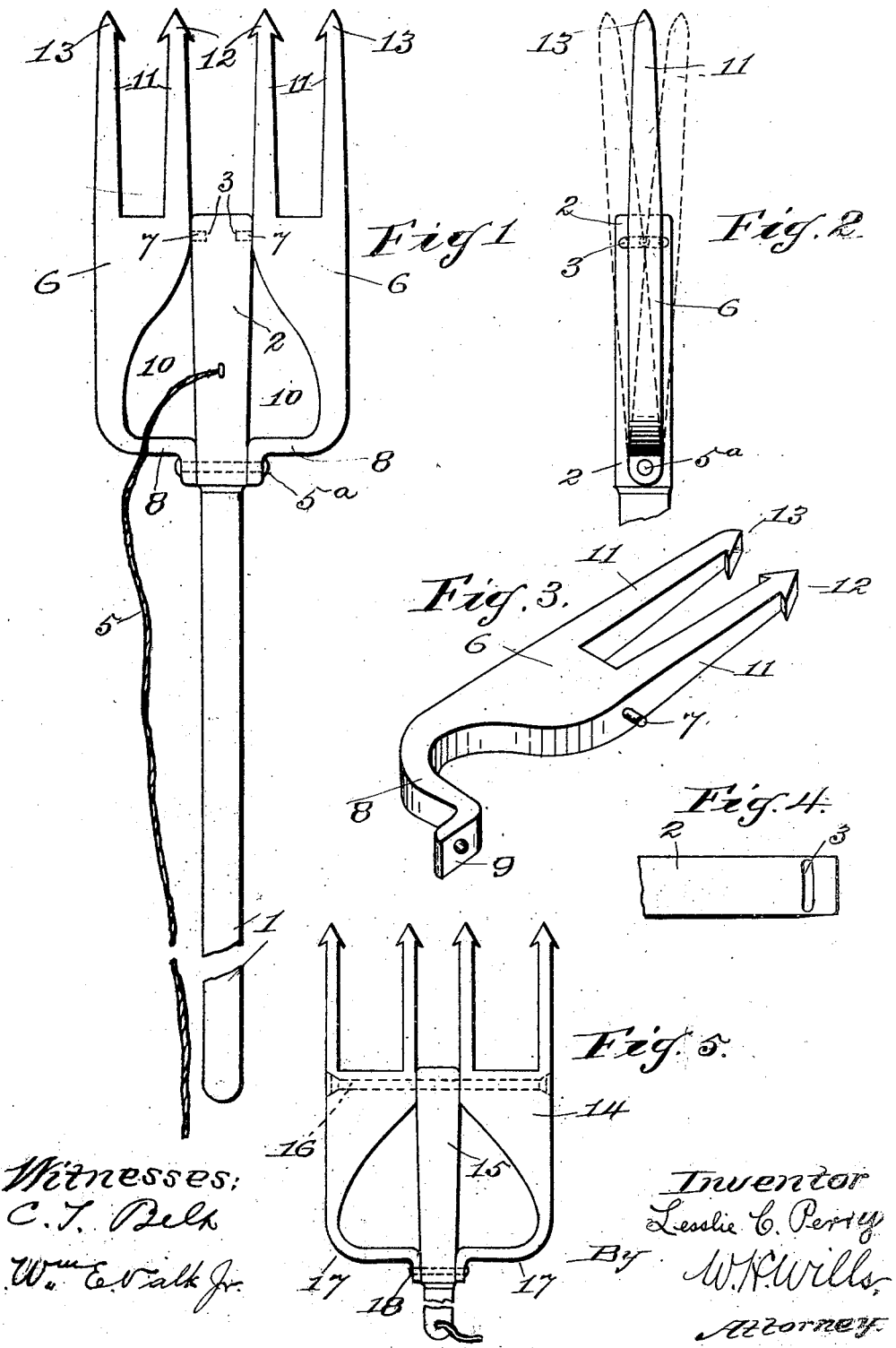

LESSLIE C. PERRY, OF HAYNES, ARKANSAS.

FISHING-GIG.

No. 923,573.  Specification of Letters Patent.  Patented June 1, 1909.

Application filed September 30, 1908. Serial No. 455,458.

*To all whom it may concern:*

Be it known that I, LESSLIE C. PERRY, a citizen of the United States, residing at Haynes, in the county of Lee and State of Arkansas, have invented certain new and useful Improvements in Fishing-Gigs, of which the following is a specification.

This invention relates to the class of fishing and trapping, and especially to fishing gigs embodied in said class.

The object of the invention is to provide in a fishing gig a spear or harpoon of such novel and peculiar construction and arrangement of parts that it may be operated to greater advantage than the ordinary fishing gig.

A further object of the invention is to provide a fishing gig with two pairs of spears or harpoons projecting from a pair of plates having a pivot movement.

A still further object of the invention is to provide in a fishing gig, a pair of plates each having two or more spears or harpoons projecting therefrom, and each being pivoted eccentric to a movable or slidable fulcrum for each plate, so that the spears may be given lengthwise movement on their pivots.

In the accompanying drawings forming part of this application:—Figure 1 is a plan view showing the gig ready to be cast for fishing. Fig. 2 is a side elevation showing the pivot movement of the plates. Fig. 3 is a perspective view of one of the spear-plates. Fig. 4 is a side elevation of the pivot portion of the gig-rod. Fig. 5 is an elevation of a modification.

The same reference numerals denote the same parts throughout the several views of the drawings.

The gig-rod 1 has a head 2 provided with a slot 3. A fishing rope or cord 5 is attached to the head 2 between the slot 3 and the pivot 5ª, preferably adjacent the latter.

The gig-plates 6 being of the same shape and construction only one of them will be hereinafter described in detail. It has a lug or pintle 7 on its inner edge adapted to work in the slot 3 to limit the movement of the plates; said edge is inclined or curved from the pintle to the rear end of the plate 6, and the front edge of the plate is straight, so that the plate is wedged-shaped. At the rear end of the plate 6 is formed an arm 8 projecting at right-angles from the inner edge of the plate and provided with an ear 9, working on one of the pivots 5ª. The gig-head 2, arm 8, and beveled plate edge forms a V-shaped opening 10. The front end of the plate 6 has one or more arrow-head spears or harpoons 11, preferably two, one projecting from the plate flush with the beveled edge and the other projecting from the plate flush with the outer edge. These spears are parallel with each other and the inner spears have a double arrow head 12 and the outer spears a single arrow head 13. The pivot mounting of the spear-plates and the point of attachment of the cord to the rod-head are such as to permit the rod-head and spears to be worked by the cord so that a pull of the cord will move the head the extent of the slot and thereby avoid a sudden pull or jerk of the spear-plates in withdrawing the device from the water with a fish thereon. The V-shaped opening lends to the advantage of the gig in that it permits the gig to be raised, lowered and drawn through the usual water without resistance of the latter.

Referring to the modification shown in Fig. 5 of the drawings, the gig-plates 14 are secured to the gig-head 15, at one end thereof by a bolt or rivet 16, and the plates have a bowed stem 17 secured to the other end of the gig-head by a bolt or rivet 18, thus making the plates rigid with the gig-head.

Having thus described my invention what I claim as new and desire to secure by Letters Patent is:

1. In a fishing gig, the combination with a gig-rod having a suitable head provided with apertures, of a pair of gig plates connected with the head at said apertures, parallel arrow-head prongs projecting from each of said plates beyond the rod-head, and a suitable rope or cord attached to the rod-head between said apertures.

2. In a fishing gig, the combination with a gig rod having a suitable head, of a pair of gig plates each having a pivot connection with the head to permit a swinging and sliding movement of the plates, means to limit the movement of the plates, arrow-head spears projecting from the plates forward of said rod-head, and a suitable rope or cord attached to the head between said pivot connections and the limiting means.

In witness whereof I hereunto set my hand in the presence of two witnesses.

LESSLIE C. PERRY.

Witnesses:
 A. B. COFFEY,
 CAY HAWKINS.